(12) United States Patent
Ito

(10) Patent No.: US 6,228,421 B1
(45) Date of Patent: May 8, 2001

(54) METHOD FOR MANUFACTURING A CATHODE RAY TUBE

(75) Inventor: Toshiaki Ito, Osaka (JP)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 09/405,715

(22) Filed: Sep. 24, 1999

(30) Foreign Application Priority Data

Sep. 29, 1998 (JP) .................................................. 10-274914

(51) Int. Cl.[7] .............................. B05D 5/06; B05D 5/12; F26B 9/04

(52) U.S. Cl. ............................. 427/66; 427/68; 427/232; 427/235; 427/238; 118/500; 34/440; 34/441

(58) Field of Search ............................. 427/66, 68, 232, 427/235, 238, 233, 236; 34/440, 441; 118/500

(56) References Cited

U.S. PATENT DOCUMENTS 3,652,323 * 3/1972 Smith ...................................... 427/64
3,791,846 * 2/1974 Nuehring ................................ 427/72
4,513,024 * 4/1985 Morita et al. ........................... 427/65

FOREIGN PATENT DOCUMENTS 6-156709  6/1994  (JP) .
9/180632  7/1997  (JP) .

* cited by examiner

Primary Examiner—Katherine A. Bareford
Assistant Examiner—Michael Cleveland
(74) Attorney, Agent, or Firm—Merchant & Gould P.C.

(57) ABSTRACT

A coating fluid for forming a phosphor screen is coated on an inside surface of a glass panel having a wall portion provided with a wall portion edge at an outside surface of the glass panel. Then, the coating fluid on the inside surface of the glass panel is dried after facing the inside surface of the glass panel downward and placing the wall portion edge onto a panel support stand in a manner that the panel is supported on the support stand primarily by the wall portion edge. Since the glass panel is placed on the support stand in a manner that only the edge portion contacts the support stand, the scattering of coating fluid during this placement can be prevented. As a result, a uniform phosphor layer can be formed on the inside surface of the panel without decreasing the productivity for making such a glass panel on which a phosphor layer is formed.

4 Claims, 6 Drawing Sheets

FIG. IA coating step
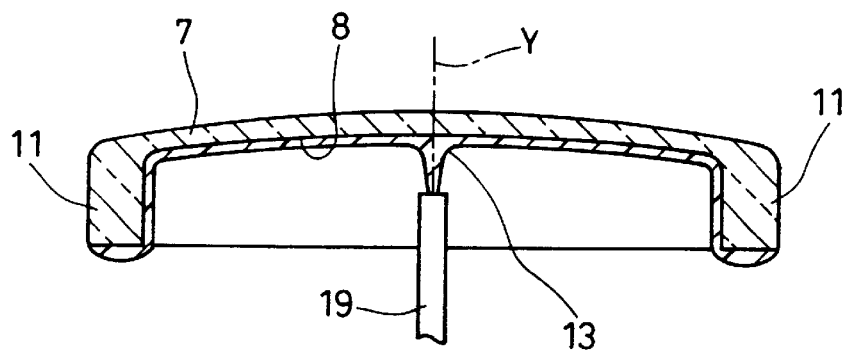
FIG. IB drying step
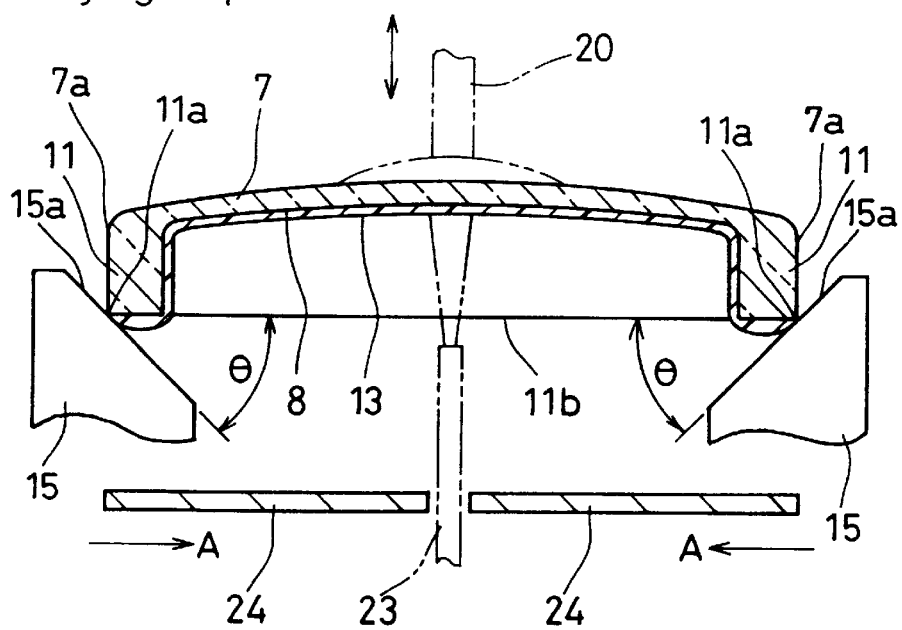

US 6,228,421 B1

METHOD FOR MANUFACTURING A CATHODE RAY TUBE

BACKGROUND OF THE INVENTION

1. Field of the Invention

The present invention relates to a method for manufacturing a cathode ray tube, such as is used for a television receiver or a computer display.

2. Description of the Prior Art

In the step for forming a phosphor screen on a glass panel in conventional methods for manufacturing a cathode ray tube, the inside surface 2 of a glass panel 1 having a wall portion 3 is coated with a coating fluid 5 for forming a phosphor screen, and then the glass panel 1 is lowered in the arrow direction "B", with the inside surface 2 of the glass panel 1 facing downward as shown in FIG. 6. After placing an end surface 3a of the wall portion 3 on a flat portion 4a of a panel support stand 4, the coating fluid 5 that has been applied to the inside panel surface 2 is dried with a heater 6.

However, in such conventional methods for manufacturing a cathode ray tube, if the glass panel 1 is lowered too fast in the arrow direction "B" onto the panel support stand 4, and the wall portion end surface 3a is placed too fast onto the flat portion 4a of the panel support stand 4, the coating fluid 5 adhering to the wall portion end surface 3a and drooping down from it is sandwiched between the wall portion end surface 3a and the flat portion 4a of the panel supporting stand. The pressure resulting from this sandwiching scatters the coating fluid 5 in the arrow direction "C", so that it adheres to the inside panel surface 2, which leads to irregularities of the phosphor formed on the inside panel surface 2. As a result, the thickness of the phosphor layer formed on the inside panel surface 2 becomes uneven, which causes brightness irregularities in the cathode ray tube using this glass panel 1.

Slowing down the speed with which the glass panel 1 is placed reduces the scattering of the coating fluid 5 over the inside panel surface 2, but this prolongs the time for placing the glass panel 1, and more time is required for forming the phosphor layer on the glass panel 1. In other words, this approach leads to a decreased productivity for making a glass panel 1 on which a phosphor layer has been formed.

SUMMARY OF THE INVENTION

It is an object of the present invention to solve the problems of the prior art and to provide a method for manufacturing a cathode ray tube that decreases the scattering of the coating fluid adhering to the end surface of the wall portion when placing the glass panel on the panel support stand, so that a uniform phosphor layer can be formed on the inside surface of the panel without decreasing the productivity for making such a glass panel on which a phosphor layer is formed.

A method for manufacturing a cathode ray tube according to the present invention comprises a coating step, in which a coating fluid for forming a phosphor screen is coated to an inside surface of a glass panel having a wall portion provided with a wall portion edge at an outside surface of the glass panel; and a drying step, in which the coating fluid coated on the inside surface of the glass panel is dried after facing the inside surface of the glass panel downward and placing the wall portion edge onto a panel support stand in a manner that the panel is supported on the support stand primarily by the wall portion edge.

Because in this method the coating fluid adhering to the end surface of the wall portion is not easily sandwiched between the end surface of the wall portion and the panel support stand when placing the glass panel on the panel support stand, the scattering of the coating fluid caused by the pressure resulting from the sandwiching can be reduced. As a result, a uniform phosphor layer can be formed on the inside surface of the panel without decreasing the productivity for making such a glass panel on which a phosphor layer is formed. Thus, brightness irregularities in the cathode ray tube using this glass panel can be reduced.

In the method for manufacturing a cathode ray tube according to the present invention, it is preferable that the panel support stand is provided with a suction device for removing by suction unnecessary coating fluid adhering to the wall portion.

With this method, the unnecessary coating fluid adhering to the wall portion is removed by suction. Thus, when the glass panel is placed on the panel support stand, the scattering of the coating fluid adhering to the end surface of the wall portion can be reduced even further.

BRIEF DESCRIPTION OF THE DRAWINGS

FIGS. 1(a) and (b) illustrate a method for manufacturing a cathode ray tube according to the first embodiment of the present invention, in which FIG. 1(a) is a sectional view illustrating a coating step, and FIG. 1(b) is a sectional view illustrating a drying step.

DESCRIPTION OF THE PREFERRED EMBODIMENTS

The following is a description of the preferred embodiments of the present invention, with reference to the accompanying drawings.

Figure 3:
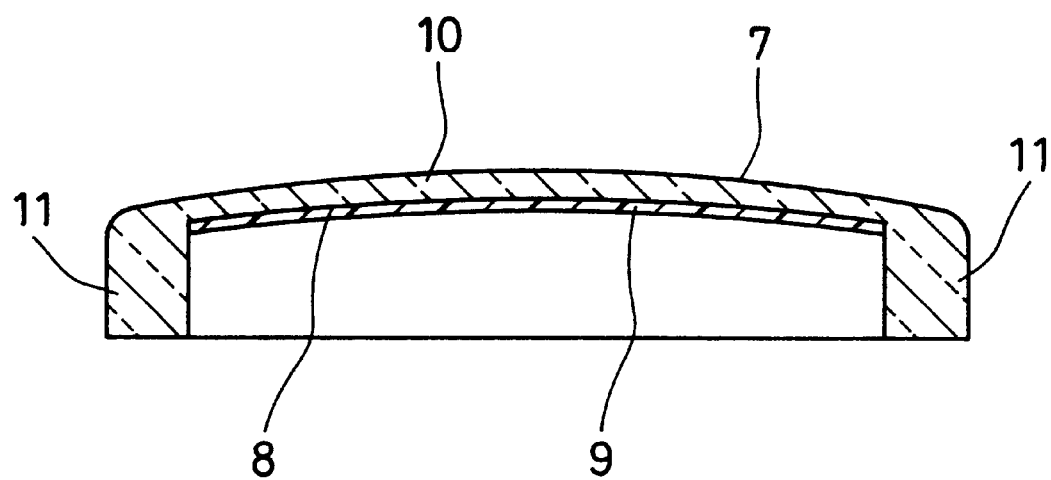
FIG. 3 is a sectional view of a glass panel of a cathode ray tube produced by the manufacturing method of the first embodiment.

As is shown in FIG. 3, a glass panel 7 of a cathode ray tube produced with a method for manufacturing a cathode ray tube according to the present invention includes a display portion 10, on whose inner surface 8 (also referred to as "inside panel surface 8" in the following) phosphors 9 are formed, and a wall portion 11 having a support pin (not shown in the drawings) for supporting a shadow mask.

Figure 4:
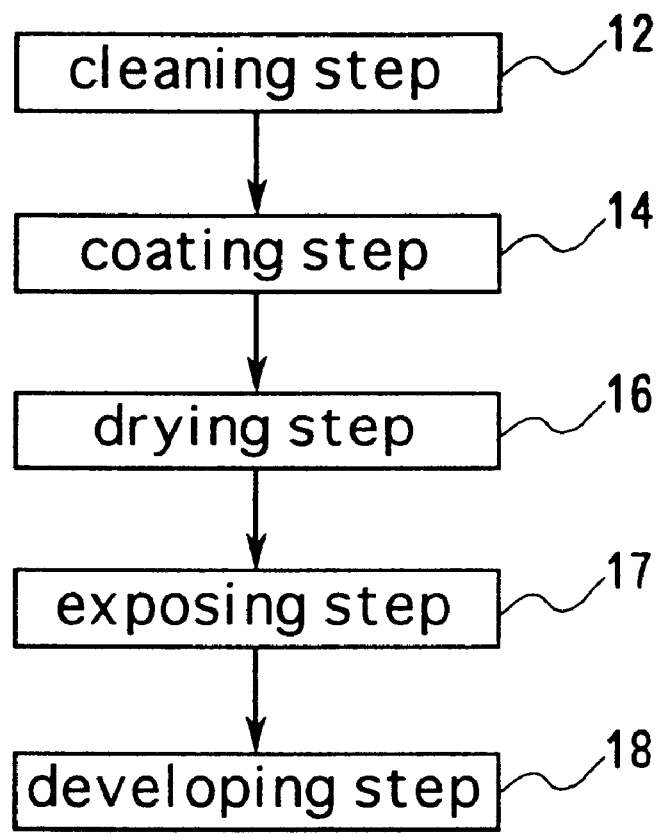
FIG. 4. is a flow-chart illustrating a method for manufacturing a cathode ray tube according to the first embodiment of the present invention.

As is illustrated in FIG. 4, a method for manufacturing a cathode ray tube according to a first embodiment of the present invention comprises a cleaning step 12, in which a glass panel 7 is cleaned; a coating step 14, in which coating fluid 13 for forming a phosphor screen is coated on the inside panel surface 8; a drying step 16, in which the coating fluid 13 on the inside panel surface 8 is dried, and which is performed after facing the inside panel surface 8 downward, and placing a wall portion edge 11a of an outside surface 7a of the glass panel 7 on a panel support stand 15; an exposing step 17, in which a shadow mask is attached to the wall portion 11, and the inside panel surface 8 is exposed so as to form phosphors of the three colors red, blue and green; and a developing step 18, in which phosphors 9 of these colors are formed on the inside panel surface 8 by development of the exposed inside panel surface 8.

The coating step 14 and the drying step 16 of the first embodiment of the present invention are carried out as is shown in FIG. 1.

In the coating step 14, as is shown in FIG. 1(a), the inside panel surface 8 is faced downward, the coating fluid 13 for forming a phosphor screen is sprayed on the inside panel surface 8 through a nozzle 19, while rotating the glass panel 7 with a predetermined number of rotations around a rotation axis Y through the center of the glass panel 7, and the inside panel surface 8 is coated uniformly with the coating fluid 13. The coating fluid 13 is composed of, for example, polyvinyl alcohol azido-based photosensitive liquid (PVA-ADC photosensitive liquid) or polyvinylpyrrolidone azido-based photosensitive liquid (PVP photosensitive liquid). Then the glass panel 7 is moved to the drying step 16 while its outside surface is held, for example by suction with a suction disk 20, as is shown in FIG. 1(b).

In the drying step 16, as is shown in FIG. 1(b), the glass panel 7 is moved with the suction disk 20, while the inside panel surface 8 faces downward, placing a wall portion edge 11a of the outside surface 7a of the glass panel 7 on a panel support stand 15. Then, the coating fluid 13 on the inside panel surface 8 is dried with a heater 24, which is located opposite the inside panel surface 8, across the panel support stand 15.

Figure 2:
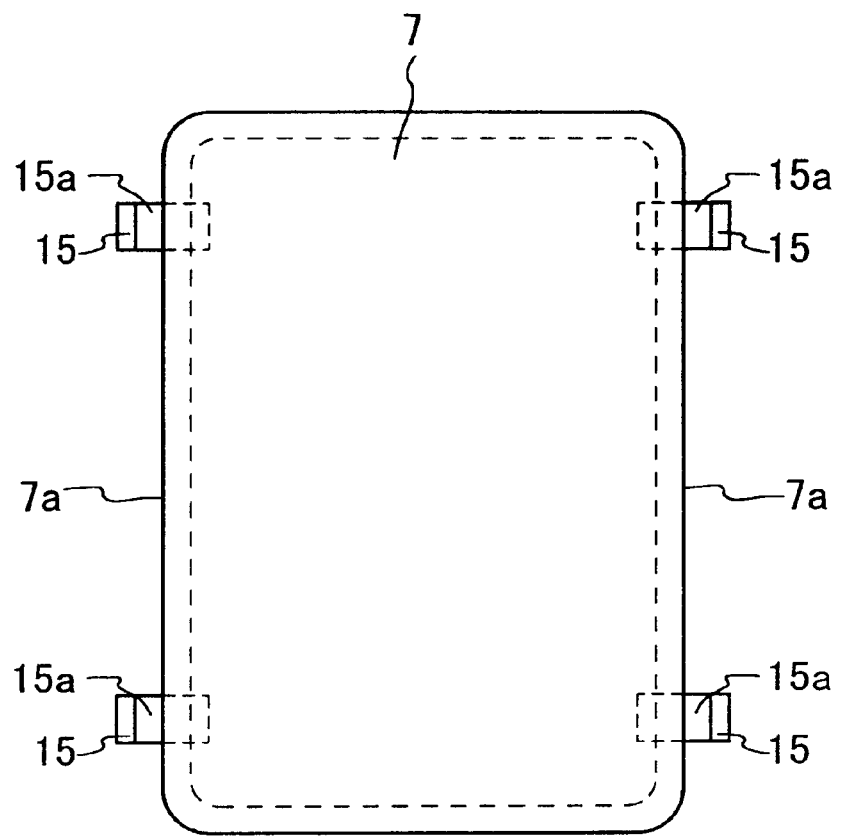
FIG. 2 is a top view illustrating the drying step of the manufacturing method of the first embodiment.

At least a flat portion 15a of the panel support stand 15 is softer than the glass panel 7, and is made of, for example, a fluoroplastic with high heat resistance and chemical resistance. The two long sides of the glass panel 7 are provided with two panel support stands 15 each, as is shown in FIG. 1(b) and FIG. 2. Moreover, the surface of the panel support stand 15 contacting the wall portion edge 11a is flat, and the flat portion 15a slopes downward from the outside to the inside along direction A. In other words, it is inclined at an angle θ with respect to the end surface 11b of the wall portion 11. It is preferable that this tilt angle θ is 10°–80°, more preferably 15°–75°, because if the tilt angle θ is 10° or less, the coating fluid 13 adhering to the end surface 11b of the wall portion 11 may be scattered, and if the tilt angle θ is 80° or more, the inside panel surface 8 easily can tilt with respect to the horizontal plane when the glass panel 7 is placed on the panel support stand 15. As a result, a non-uniform layer of phosphor 9 may form on the inside panel surface 8.

The heater 24 includes a surface heater which is divided into two equal parts at the position opposite to the central portion of the inside panel surface 8.

The following explains the operational effect of the first embodiment of the present invention.

In a method for manufacturing a cathode ray tube according to the first embodiment of the present invention, the inside surface 8 of a panel having a wall portion 11 is coated with a coating fluid 13 for forming a phosphor screen. Then, the wall portion edge 11a of the outside surface 7a of the glass panel 7 is placed on the panel support stand 15. Thus, the coating fluid 13 adhering to the end surface 11b of the wall portion 11 is not so easily sandwiched between the end surface 11b of the wall portion 11 and the flat portion 15a of the panel support stand 15, and the scattering of the coating fluid 13 caused by the pressure resulting from this sandwiching can be reduced. As a result, a uniform layer of phosphor 9 is formed on the inside panel surface 8, and brightness irregularities in the cathode ray tube using this glass panel 7 can be reduced.

Moreover, since this method reduces the scattering of the coating fluid 13, the glass panel 1 can be placed with higher speed. This reduces the time required for forming the layer of phosphor 9 on the glass panel 1 and improves the productivity for manufacturing a glass panel 7, on which such a layer of phosphor 9 is formed. According to experiments conducted by the inventors, the time required to place the glass panel 7 in the first embodiment of the present invention (i.e., the period between fastening the glass panel 7 with the suction disk 20 after the coating step and placing the panel 7 on the support stand 15, after moving it to the drying step 16) is 10 seconds on average, whereas 15 seconds are required in conventional methods.

Figure 5:
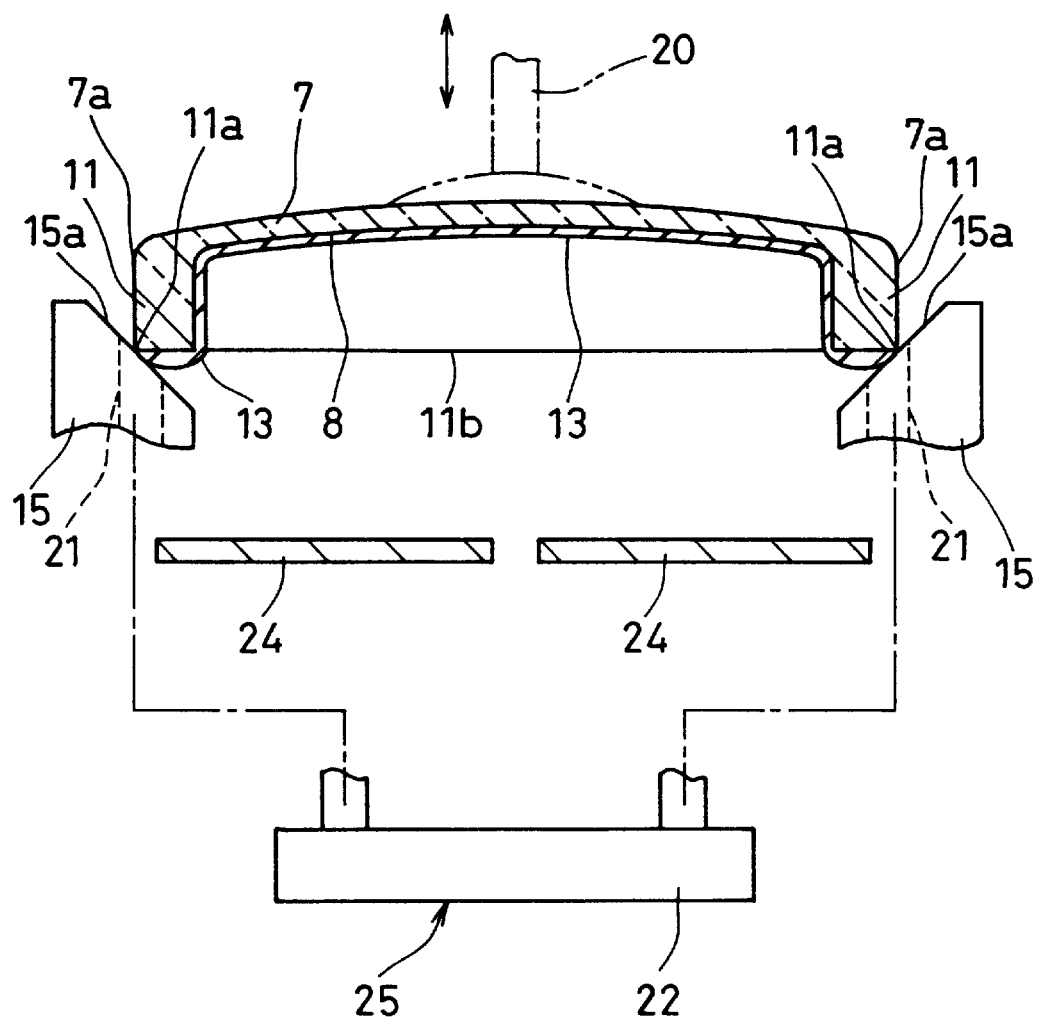
FIG. 5. is a sectional view illustrating a drying step of a method for manufacturing a cathode ray tube according to the second embodiment of the present invention.
Figure 6:
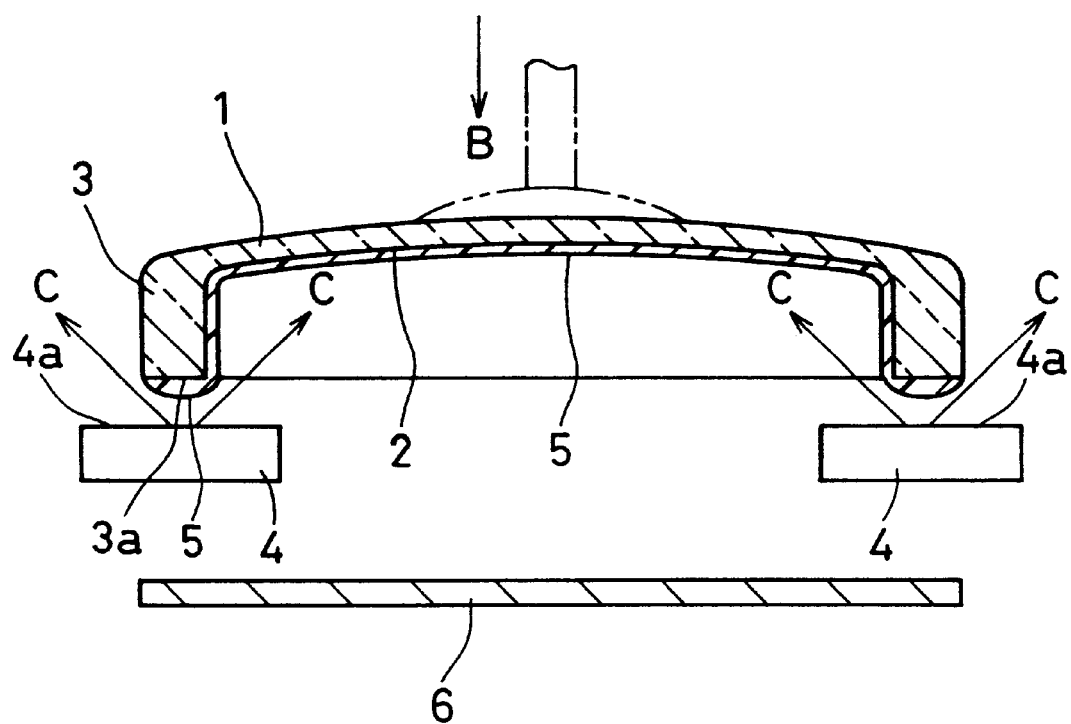
FIG. 6 is a sectional view illustrating a drying step of a conventional method for manufacturing a cathode ray tube.

FIG. 5 illustrates a second embodiment of the present invention. The second embodiment differs from the first embodiment in that the panel support stand 15 is provided with a suction device 25 for removing by suction unnecessary coating fluid 13 adhering to the end surface 11b of the wall portion 11. This suction device 25 includes, for example, an air duct 21 in a central portion of the panel support stand 15, which is in contact with the wall portion edge 11a, and removes by suction unnecessary coating fluid 13 adhering to the end surface 11b of the wall portion 11 with a vacuum suction device 22 through the air duct 21.

In this embodiment, removing by suction unnecessary coating fluid 13 adhering to the end surface 11b of the wall portion 11 further reduces the scattering of the coating fluid 13 adhering to the end surface 11b of the wall portion 11, when placing the glass panel 7 on the panel support stand 15.

Moreover, since the coating fluid 13 between the end surface 11b of the wall portion 11 and the flat portion 15a of the panel support stand is removed as well, this decreases the not-yet-dried coating fluid 13 that remains on the glass panel 7 including the end surface 11b of the wall portion 11 after the drying step 16. As a result, it is possible to reduce, for example, the problem that in the following exposing step 17, the not-yet-dried coating fluid 13 drops and for example stains the corrective lens, when placing the glass panel 7 on an exposing stand, or the problem that during the installation of the shadow mask, the not-yet-dried coating fluid 13 adheres to the shadow mask and causes staining of the shadow mask.

In the above-noted first and second embodiments, the drying step 16, in which the coating fluid 13 is dried on the inside panel surface 8, is performed after the coating step 14 for coating PVA-ADC photosensitive liquid or PVP photosensitive liquid. However, the present invention is not limited to this, and the drying step 16 also can be applied to the drying step in the developing step 18 shown in FIG. 4, after a carbon coating step of coating a carbon particle fluid, or after a phosphor coating step of coating a mixed fluid of photosensitive particles and PVA. As should be clear from the above explanations, the coating fluid 13 for forming a phosphor screen applied in the coating step 14 is a PVA-ADC photosensitive liquid or a PVP photosensitive liquid, in the carbon coating step it is a carbon particle fluid, and in the phosphor coating step it is a mixed fluid of photosensitive particles and PVA.

In the above-noted embodiments, the upper surface of the panel support stand 15 is flat, and this flat portion 15a supports the wall portion edge 11a. However, the present invention is not limited to this, and the cross section of the panel support stand through the wall portion edge 11a also can be arc-shaped, triangular (in which cases the upper surface of the panel support stand 15 forms a ridge supporting the wall portion edge 11a, so that the contact area between the panel support stand 15 and the wall portion edge 11a is point-shaped and not line-shaped as in the preceding embodiments), or of undulating shape, such as saw-tooth shape or wave-like shape. Also, in the above-noted embodiments, the two long sides of the glass panel 7 are provided with two panel support stands each. However, the present invention is not limited to this, and it is also possible that the short sides of the glass panel 7 have two panel support stands each, or both the long and short sides of the glass panel 7 are provided with one or more panel support stands. It is also possible that one support stand is provided throughout the entire perimeter of the glass panel 7.

Furthermore, in the above-noted embodiments, the coating fluid 13 applied to the glass panel 7 was dried with a heater 24. However, the present invention is not limited to this, and instead of the heater 24, it is possible to blow, for example, air or heated air through a nozzle onto the central portion of the inside panel surface 8. Alternatively, it is possible to combine the heater with blowing air or heated air, as shown in FIG. 1(b), wherein, air or heated air is blown onto the inside panel surface 8 through a nozzle 23, which has been inserted between the two divided parts of the surface heater. The nozzle 23 is indicated by a two-dots-dashed line in FIG. 1(b).

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for manufacturing a cathode ray tube comprising:

a coating step, in which a coating fluid for forming a phosphor screen is coated to an inside surface of a glass panel having a wall portion provided with a wall portion edge at an outside surface of the glass panel; and a drying step, in which the coating fluid coated on the inside surface of the glass panel is dried after facing the inside surface of the glass panel downward and placing the wall portion edge onto a panel support stand so that only the wall portion edge contacts the panel support stand.

2. The method according to claim 1, wherein the panel support stand has a flat surface for supporting the wall portion edge.

3. The method according to claim 1, wherein a cross-section of the panel support stand has a configuration selected from the group consisting of a triangular shape, an arc-shape, a saw-tooth shape and a wave-like shape for supporting the wall portion edge.

4. The method according to claim 1, wherein the panel support stand is provided with a suction device for removing by suction coating fluid adhering to the wall portion.

* * * * *